United States Patent [19]

Cheung

[11] Patent Number: 4,527,195
[45] Date of Patent: Jul. 2, 1985

[54] APPARATUS FOR ENCODING AND DECODING INFORMATION

[75] Inventor: William S. H. Cheung, Hong Kong, Hong Kong

[73] Assignee: Payview Limited, Kowloon, Hong Kong

[21] Appl. No.: 387,411

[22] Filed: Jun. 11, 1982

Related U.S. Application Data

[63] Continuation-in-part of Ser. No. 134,185, Mar. 16, 1980, Pat. No. 4,396,947, and Ser. No. 302,789, Sep. 16, 1981, abandoned.

[30] Foreign Application Priority Data

Feb. 20, 1979 [GB] United Kingdom ................. 7905858

[51] Int. Cl.³ .......................... H04N 7/16; H04K 1/04
[52] U.S. Cl. .................... 358/120; 358/123; 358/124
[58] Field of Search .......................... 358/120, 123, 124

[56] References Cited

U.S. PATENT DOCUMENTS

| | | | |
|---|---|---|---|
| 2,857,455 | 10/1958 | Jolliffe | 358/123 |
| 2,916,543 | 12/1959 | Druz | 358/123 |
| 3,081,376 | 3/1963 | Loughlin et al. | 358/120 |
| 3,478,166 | 11/1969 | Reiter et al. | 358/120 |
| 3,813,482 | 5/1974 | Blonder | 358/120 |
| 3,826,863 | 7/1974 | Johnson | 358/122 |
| 3,919,462 | 11/1975 | Hartung | 358/124 |
| 4,022,972 | 5/1977 | Pires | 358/124 |
| 4,081,832 | 3/1978 | Sherman | 358/124 |
| 4,222,068 | 9/1980 | Thompson | 358/124 |
| 4,295,155 | 10/1981 | Jarger et al. | 358/120 |
| 4,307,416 | 12/1981 | Spano | 358/124 |
| 4,319,273 | 3/1982 | Nossem | 358/120 |
| 4,348,691 | 9/1982 | Mistry | 358/120 |
| 4,353,088 | 10/1982 | Toonder | 358/120 |

Primary Examiner—S. C. Buczinski
Attorney, Agent, or Firm—Pollock, Vande Sande & Priddy

[57] ABSTRACT

Apparatus for encoding and decoding information. Multiple scrambling techniques are provided to prevent unauthorized reception of a television picture signal. A first mode of scrambling provides for shifting randomly occurring horizontal synchronization pulses within each field of video signal producing horizontal as well as vertical instability. Video line inversion of selected lines within a field comprises a second mode of scrambling of the signal. A third mode of scrambling provides for amplitude shifting the television signal during selected portions of the signal which contains luminance and chrominance information following a line synchronization pulse.

20 Claims, 21 Drawing Figures

ENCODER

ENCODER

DECODER

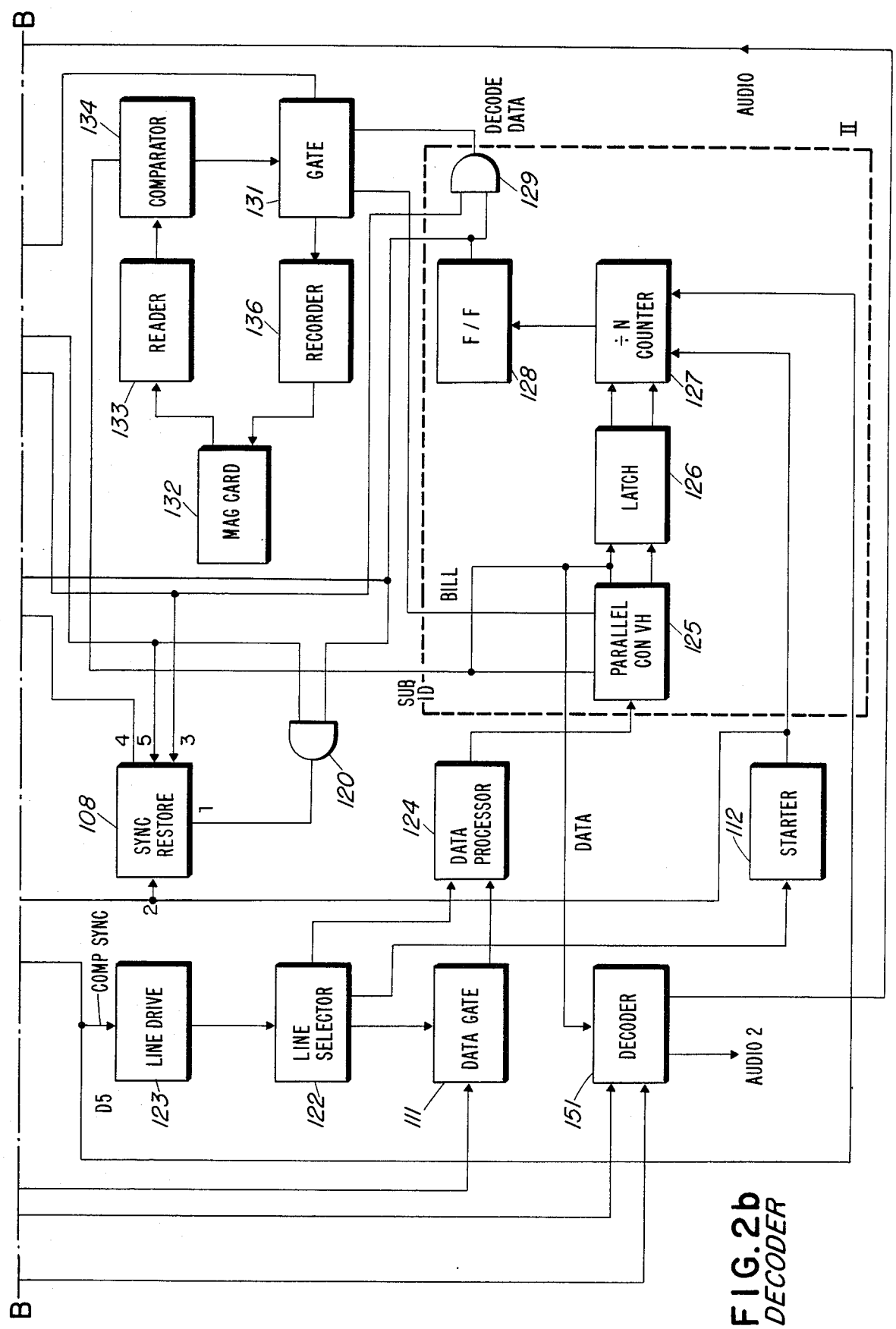
FIG.2b *DECODER*

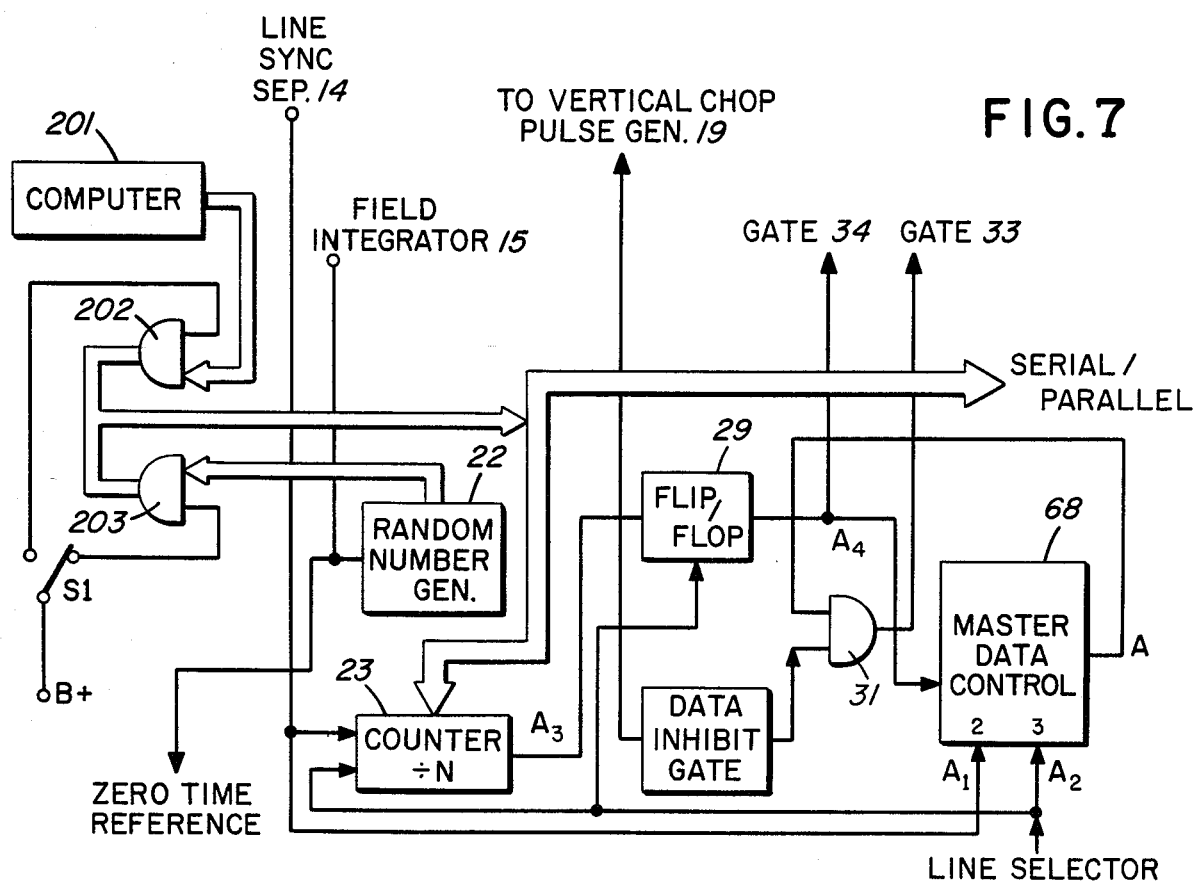
FIG. 7
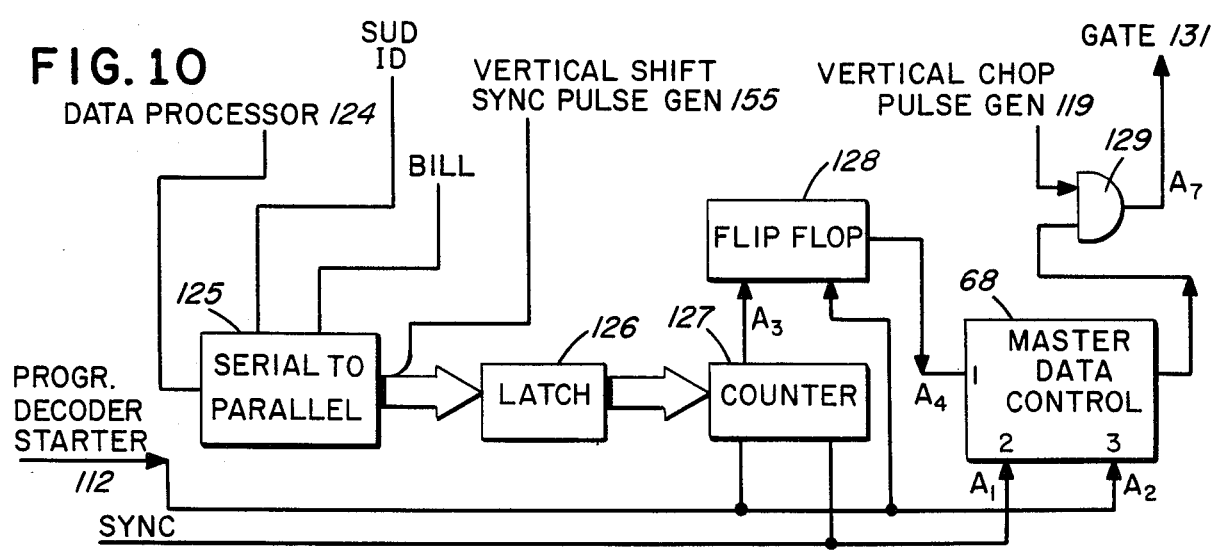
FIG. 9
FIG. 10

LINE CHOP PULSE

LINE SYNC. SHIFT

R.F. LEVEL CONTROL PULSE

OUTPUT R.F. LEVEL

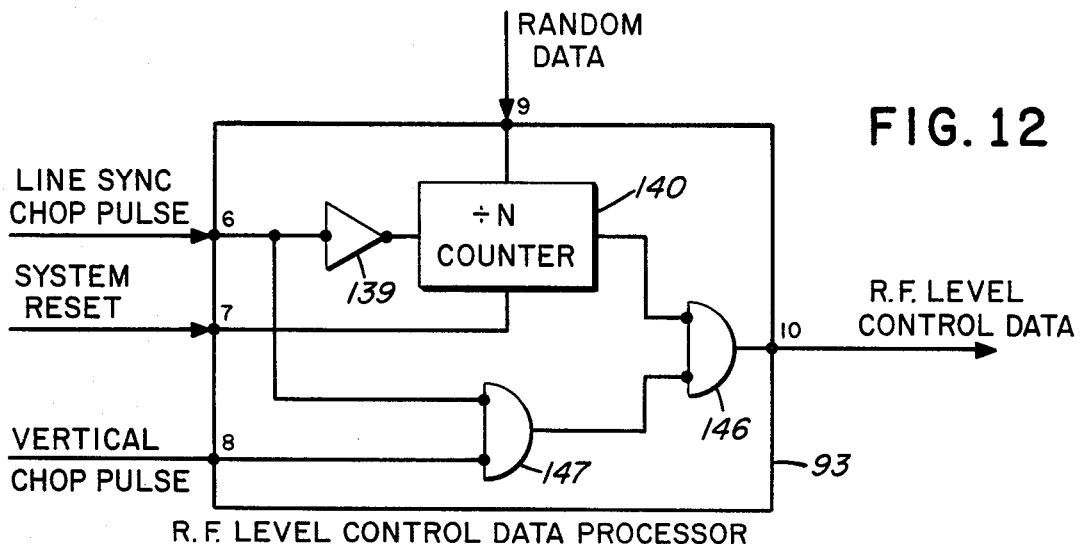
FIG. 12
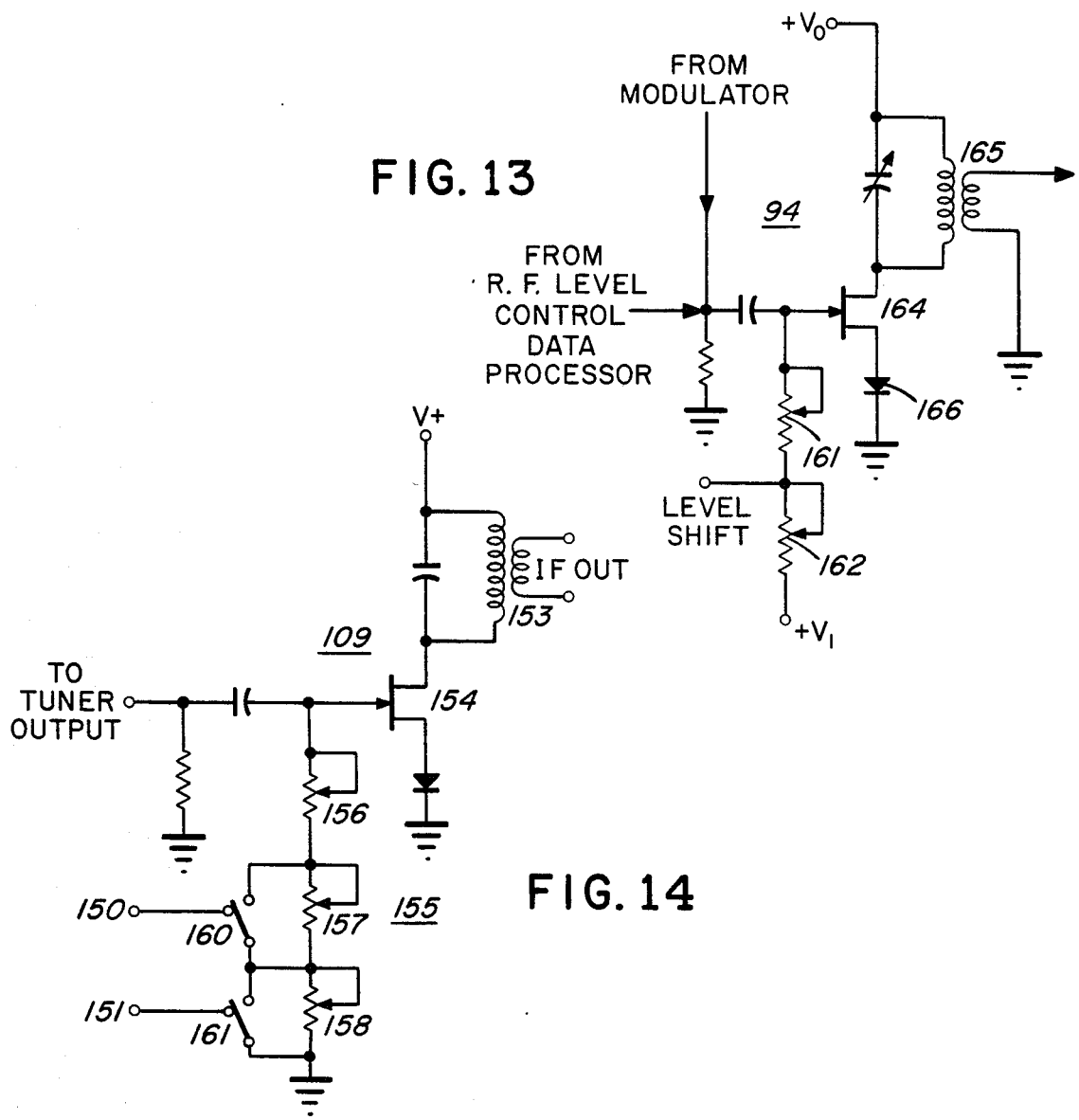
FIG. 13
FIG. 14

APPARATUS FOR ENCODING AND DECODING INFORMATION

This is a continuation-in-part of Ser. No. 134,185 filed Mar. 16, 1980, now U.S. Pat. No. 4,396,947, and Ser. No. 302,789 filed Sept. 16, 1681, now abandoned.

BACKGROUND OF THE INVENTION

This invention relates to encoding a television signal, and it is also concerned with the transmission of such an encoded signal, and the reception and decoding of such a signal.

Coding of information is required when it is desired to restrict the reception of the information in intelligible form to certain recipients, for example, the subscribers to a television service.

In my earlier above-identified patent application I described several methods of encoding information. The first method includes shifting the vertical blanking pulse which results in vertical instability to a non-subscriber's television receiver. Also, video line inversion is described wherein a plurality of lines within a given field are randomly selected for inversion. In one embodiment described in the previous application, a first line for inversion is selected on a random basis for each field. Subsequent alternate lines are inverted to provide a scrambled picture.

Encoding apparatus for television signals in which the information bearing portions of some lines are inverted are shown in U.S. Pat. Nos. 3,801,732, 3,919,462, 4,022,972 and 4,025,948.

SUMMARY OF INVENTION

In accordance with one aspect of the invention, both scrambling and descrambling of a video signal is provided to prevent unauthorized reception of a television picture. Multiple scrambling techniques are provided by the invention to distort a processed video signal making viewing of the television picture objectionable.

In one technique of scrambling a video signal in accordance with the invention, certain line synchronization pulses marking the beginning of a line of a video signal are level shifted. The line synchronization pulses are level shifted to randomly form an irregular pattern within each field of the video signal. Successive fields of the video signal contain a pattern of level shifted line synchronization pulses which generate picture instability. Decoding techniques are provided for identifying the shifted synchronization pulses and restoring the pulses to the proper level whereby an unscrambled picture signal is provided.

In another technique in accordance with the invention, video line inversion may be provided with random line synchronization pulse shifting to provide an additional disturbance to the picture. Additional decoding is therefore required to re-invert scrambled portions of the video signal before viewing the picture contained by the signal.

In still another aspect of the invention, level shifting of the portion of the television radio frequency signal level is provided which adds yet another degree of scrambling to the signal. During portions of the modulated television transmitter signal which contain luminance and chrominance comprising details of the picture to be displayed, the amplitude of the modulated signal is shifted. Decoding at the television receiver restores the amplitude of the modulated video signal.

In apparatus which employs one or more of the above scrambling techniques, a coded signal is transmitted along with the scrambled video signal identifying the shifted synchronization pulses, inverted video lines or portions of the RF signal which is shifted. The coded signal may be contained in the vertical interval of the video signal which is decoded and used to descramble the signal.

DESCRIPTION OF THE FIGURES

FIGS. 2a and 2b are block diagrams of a decoding apparatus for descrambling a signal produced by the encoder of FIG. 1.

FIG. 7 is a block diagram of specific apparatus for providing alternate line inversion during each field of a video signal.

FIG. 9 is a schematic drawing of master control logic circuit 68 of FIG. 7 and FIG. 10.

FIG. 10 is a schematic drawing of a decoding circuit for alternately inverting scrambled video lines produced by the apparatus of FIG. 7.

FIGS. 11a–11g illustrate the signals produced by the encoder of FIG. 1 which are employed in shifting the RF signal level.

FIG. 12 illustrates specific apparatus for providing a level shift pulse to the level shifter 94 of FIG. 1 and to circuit 109 of FIG. 2.

FIG. 13 is a schematic drawing of specific circuitry for implementing level shifter 94 of FIG. 1.

FIG. 14 is a schematic drawing of specific circuitry for implementing circuit 109 of FIG. 2.

DETAILED DESCRIPTION OF THE INVENTION

Figure 3:
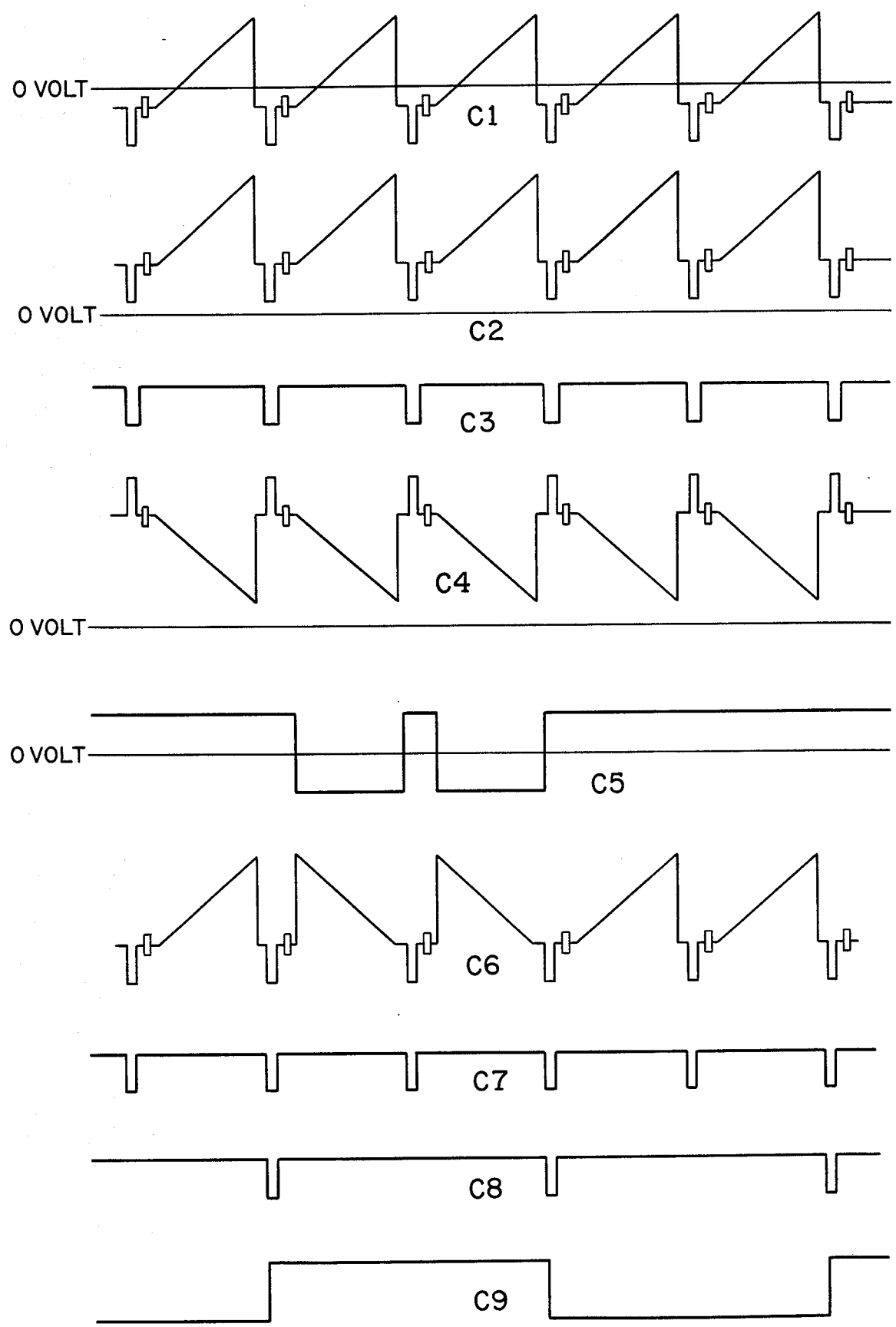
FIG. 3 illustrates signal waveforms produced by the apparatus of FIGS. 1 and 2.

As shown in FIG. 3, waveform C1 shows five line periods of a composite video signal. Each line period comprises an initial negative-going DC line synchronization pulse, a short synchronizing burst of high frequency signals and a period of positive going amplitude modulated carrier wave signals representing the video information in the line. The signals representing the video information are shown to have a saw-tooth envelope, but in practice will have an irregular envelope. The composite waveform is related to ground potential in that the negative extreme potential of the line-synchronization pulse and the maximum possible potential of the video signal are equal and opposite.

For the encoding process to be described it is convenient if the whole composite video signal is of a single polarity. The signal is therefore applied to a distribution amplifier 11 (FIGS. 1a, 1b) and a signal from a DC level inserter circuit 51 is applied on line 52 to the amplifier 11 to shift the whole composite signal to a positive polarity, as shown at waveform C2.

The amplifier 11 has a second output at which the unshifted amplified composite video signal appears and which is connected through a low pass filter 12 to a synchronization separator circuit 13. This circuit 13 produces an output to a line synchronization separator 14 which separates out the initial negative-going DC pulse of the composite signal, and an output to a field integrator 15 which produces a signal representing field synchronization pulses of the vertical blanking period at the beginning of a field. Since the line and field pulses produced do not occur right at the beginning of the lines and field respectively, delay circuits 16, 17 are included after respective circuits 14 and 15 producing an output exactly at the start of the next line and field, the delays being slightly less than one line and one field period respectively. The output of the circuit 16 is shown at waveform C3. Each pulse occurs accurately at the beginning of a line, whereas the input signal derived from the line synchronization pulses of waveforms C1 and C2 are slightly delayed at the beginning of the line. Connected to the line delay circuit 16 is a line chop pulse generator 18 which responds to the output pulse at the start of the line and produces a chop pulse during the video period of the composite line signal which is applied to one input of an AND gate 21. The chop pulse does not occur during the line synchronization or when the synchronization chroma burst occurs. Similarly, a vertical chop pulse generator 19 responds to the output of the field delay circuit 17 at the start of a field to produce a signal starting at the end of each field period and this signal is applied to the other input of the AND gate 21. The AND gate 21 will therefore produce a signal except during the line and field synchronization periods, i.e. the signal is produced during the period available for video information in every line.

Pulses at field frequency produced by the field integrator 15 are applied to a random number generator 22. On the receipt of an input pulse, the number generator 22 generates a random binary number on parallel output lines which are connected first to a divide-by-N counter 23 (which can be a logic unit SN 74193) and secondly to a parallel to a serial converter 24 which converts the signals on the parallel lines into a train of pulses representing the random number generated and the train of pulses is applied to a data processor 25 to be discussed below. The divide-by-N counter 23 is fed with signals occurring at line frequency (waveform C7) from the line synchronization separator 14 and is a special form of shift register. The counter is arranged to respond to only the Nth pulse received on its data input line and to forward the counted pulses (waveform C8) to a flip-flop 29 whose output (waveform C9) energizes an input of AND gate 31 between alternated sets of N line pulses. The value of N is the random number generated for each field. The output of the vertical chop pulse generator 19 also operates a data inhibit gate 32 whose output continues after the vertical chop pulse for the period of the first few lines of the field which are to be used for transmitting data. The output of gate 32 is connected to the other input of the AND gate 31 so that the AND gate 32 only produces an output alternating every N lines other than during the vertical blanking and data periods. The output of the AND gate 21 is connected to the input of AND gate 33. The AND gate 33 is therefore enabled during alternate N lines pulse periods except during the line and the vertical blanking periods.

The output of gate 33 causes complementary actuation of two analog transmission gates 35 and 36, the connection to gate 36 being through inverter 58.

AND gate 34 has one input connected to the line chop pulse generator 18 and the other input connected to a line from the flip-flop 29 also connected through a programmable counter 59 to an audio coding unit 61 as described in my co-pending application Ser. No. 91,781 now U.S. Pat. No. 4,329,711. The gate 34 thus produces an output which comprises line chop pulses which occur at regular intervals in a given field established by the counter 23. The count N changes every field thus changing the number of line chop pulses provided by gate 34. The relationship between the number N, where N equals 3, and the output of gate 34 and FF 29, are shown more particularly in FIG. 4.

As an improvement over the devices described in my previous patent application, shifting of line synchronization pulses to form an irregular pattern with the remaining line synchronization pulses is provided. Circuit 90 receives as inputs the output of gate 34, and chop pulses from line chop pulse generator 18 and field chop pulse generator 19 respectively.

Figure 5:
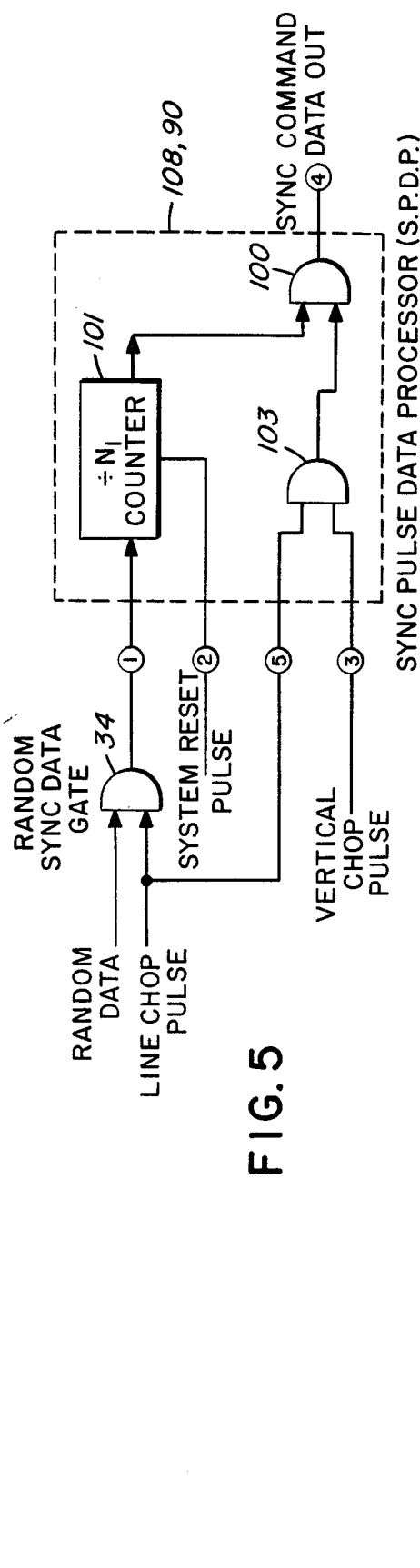
FIG. 5 is a schematic drawing of specific apparatus for level shifting line synchronization pulses.

Referring now to FIG. 5, the structure of circuit 90 can be seen to include a divide by $N_1$ counter 101 where $N_1$ may be a constant number. Alternatively, arrangements can be made to vary the value of $N_1$ periodically adding further security to the systems.

The counter 101 output is combined in AND gate 100 with the output of AND gate 103. AND gate 103 inhibits gate 100 during the interval when neither line synchronization pulses or field synchronization pulses are being transmitted.

Referring again to FIG. 4, there is shown the output synchronization command data of signal circuit 90. The circuit provides at irregular intervals synchronization command data pulses which occur simultaneously with certain synchronization pulses. The output of circuit 90 is applied to synchronization scramble circuit 53 whereby certain synchronization pulses are shifted in level by the synchronization data. Although shifting the level of the line synchronization pulses is believed to be the preferred method of modifying the pulses, other methods for modifying the pulses to form an irregular pattern with the remaining line synchronization pulses will suggest themselves to those skilled in the art.

The effect on the television receiver of a non-subscriber viewing a picture which contains line synchronization pulses which are shifted in an irregular pattern are multi-fold. First, the shifted synchronization pulses alter the starting point of the video line which follows. The unshifted synchronization pulses which follow thereby cause a disturbance producing line jitter throughout the field of the picture.

Additionally the AGC level of the receiver will vary. The receiver AGC detector detects the line synchronization tip level and normalizes the remaining portion of the video signal with respect to the line synchronization tip level. The shifted line synchronization pulses result in a change in receiver AGC voltage. Due to the time constant associated with the AGC voltage, the drifted AGC voltage results in a further disturbance to the starting point for displayed horizontal video lines which follow the shifted synchronization pulses. The starting point is determined under this condition by the video information which follows a shifted synchronization pulse. Therefore, the starting point for lines identified by shifted line synchronization pulses changes with the content of the received video signal.

A further disturbance occurs to the picture as a result of the unstable AGC voltage. The field synchronization pulse amplitude, when under control by an unstable AGC voltage, produces vertical instability to the picture. Thus, during recovery of the receiver AGC voltage from the effects of the shifted irregular occurring line pulses, the subsequently produced field synchronization pulse is at an improper amplitude for correctly establishing the starting position of the field resulting in picture vertical roll.

The outputs of the line synchronization separator 14 and of the field integrator 15 are also applied to a synchronization processor 62 connected to a clock pulse generator 63. The clock pulse generator output is also applied to the converter 24 and the data processor 25. The processor 62 shapes the line and field synchronization signals with the assistance of the clock pulses, and feeds the shaped signals to the converter 24 and a line selector and coding starter 37. The starter 37 is fed with the output of a zero time reference generator 38 activated by the output of field integrator 15 to signify the beginning of a field, and provides an output to a data insertion unit 56 during selected lines of a field during which lines of data (as distinct from video) are fed. Two channels of coded audio information from an encoder 61 are also controlled by the random number generator 22 as described in my aforementioned co-pending application Ser. No. 91,781. The data information is assembled in the parallel to serial converter 24 in the form of a train of binary signals representing in turn, the random number generated by 22, the subscriber's identity data (e.g. the state of his account) and the billing data (e.g. the rate at which the program is to be charged). The processor 25 converts the binary signals into biphase signals and feeds them to the data insertion unit 56. The starter 37 also resets the counter 23 at the end of each field to be ready for a new value of N generated by 22 for the next field.

The composite video signal amplified by the distribution amplifier 11 and shifted in level by the circuit 51 passes to the line synchronization scrambling circuit 53 which is enabled in response to the output of circuit 90 to shift the DC level of the synchronization signal in a random manner depending on the random number generated. The output of the shifting circuit 53 is supplied to a phase splitter 54 which provides two signals of equal and opposite polarity which are fed through complementary analog transmission gates 35 and 36 whose outputs are combined in an adding circuit 55 and connected through the data insertion circuit 56 to a modulator 57. The analog transmission gates 35 and 36 are enabled alternately by signals connected respectively directly to the output of AND gate 33 and through inverter 58 to the output of AND gate 33. Thus, during the video periods of certain lines as selected by the random generator 22, the polarity of the transmitted signal will be reversed. The line synchronization pulses are unaffected by circuits 35 and 36 since the line chop pulse generated by chop pulse generator 18 only starts at the beginning of the video period. The outputs from the gates 35 and 36 combined in the adding circuit 55 are combined with the output of the data processor 25 during the times selected by the starter 37 by the data insertion circuit 56 which is then used to modulate a carrier signal in the modulator 57. The modulator 57 is also fed with two channels of coded audio information by a coder 61 fed from the converter controlled by the random number generator 22 as described in my co-pending application Ser. No. 91,781 filed Nov. 6, 1979, hereby incorporated by reference.

Waveform C2 of FIG. 3 shows five line periods of the composite video signal, non-inverted, as applied to gate 35. Waveform C4 shows the same five line periods inverted as applied to gate 36. Waveform C5 shows the switching pulses applied to gate 35, causing gate 35 to transmit the first, fourth, and fifth lines completely and the line synchronizing periods of the second and third lines. During the negative going periods of the switching pulses, gate 36 is enabled by inverter 58, so that the inverted video signal is transmitted for the second and third lines. The signal combined by adder 55 is shown at waveform C6.

The composite video signal is thus encoded in two ways. The line synchronization DC level is shifted in a random manner by the circuit 53, and certain groups of lines of video information are reversed in polarity according to the random number generated by 22 for each field. A receiver which was not fitted with a matching decoder would produce a picture which experiences line jitter and vertical roll as the hold circuits in such a receiver cannot synchronize the received picture. Additionally disturbances to receiver AGC will result in additional disturbances to the horizontal hold and vertical hold. Furthermore, alternate groups of lines would appear distorted due to the inversion of the video signal and the width of these groups would change in each field so that no part of the picture would be likely to remain undistorted long enough to be enjoyed by the viewer. The random number is generated anew for each field so that the change in the line group pattern occurs generally at 50 or 60 hertz.

The modulator 57 feeds a transmitter (not shown) through level shifter 94 and the coded signals are received in a receiver as shown in FIG. 2.

Figure 6:
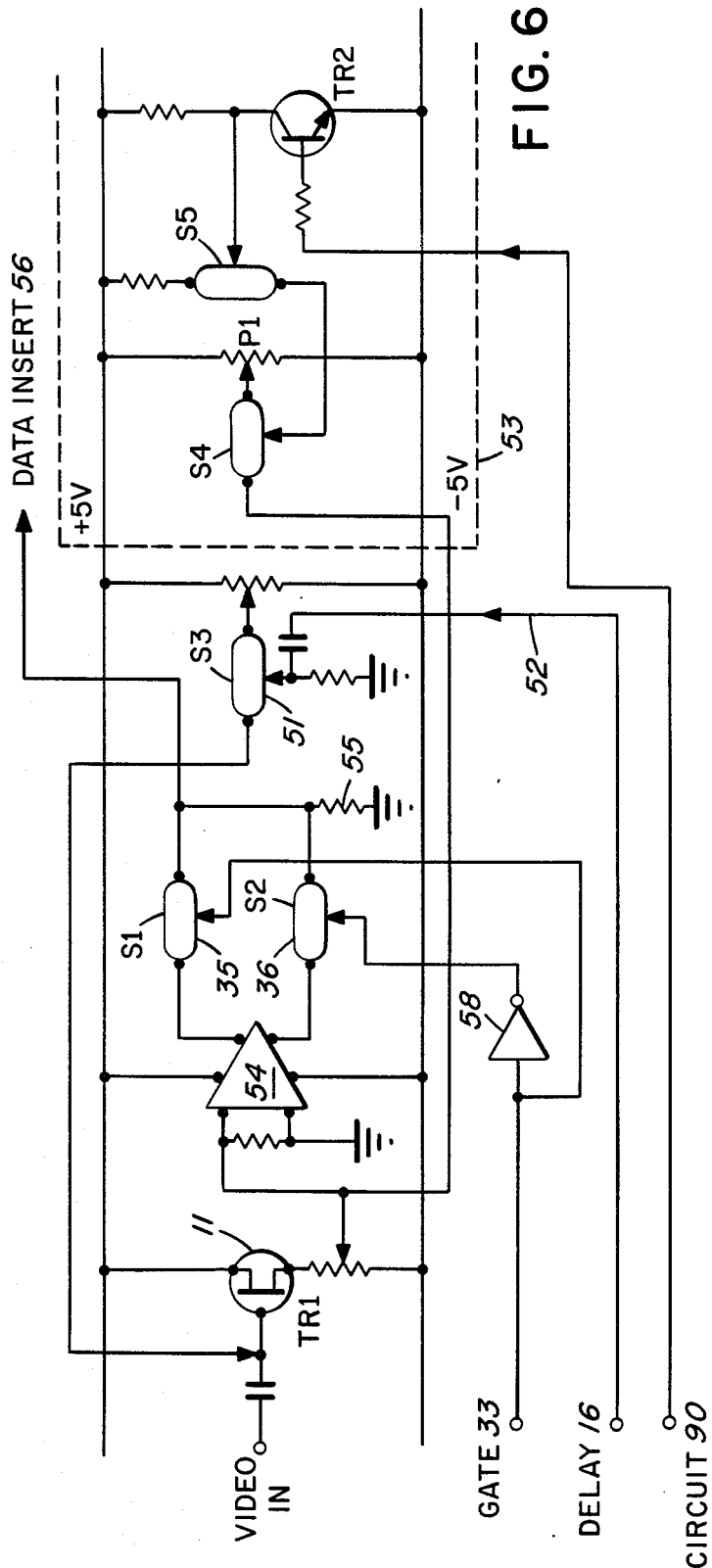
FIG. 6 is a schematic drawing of apparatus for level shifting synchronization pulses in the encoder and decoder of FIGS. 1 and 2.

FIG. 6 shows some components of FIG. 1 in greater detail. The distribution amplifier 11 comprises a field effect transistor TR1 to whose gate the composite video input is applied. An additional DC level is added to the applied composite video input from switch S3 under the control of a signal from the line synchronization separator 14 on line 52. The amplified signal appears across a load resistor of TR1.

The output of circuit 90 is applied to the base of transistor TR2 in the scrambler 53 which also comprises two switches S4 and S5. When a signal is received from circuit 90, S4 and S5 close and add the positive potential pulse from 34 to the input of the phase splitter 54 (an operational amplifier) in order to effect the DC common mode balance in the line synchronization pulse period. The line synchronization scrambled composite video signal is passed through the phase splitter 54 to the switches S1 and S2 forming gates 35, 36 respectively. The outputs of the switch S1 and S2 are added by the grounded resistor forming the adder 55 and passes to the data insertion circuit 56.

An additional mode of scrambling may also be provided by the encoder of FIG. 1. A level shifting circuit 94 receives the previously scrambled picture and sound information after modulation on a carrier frequency signal by modulator 57. Level shifter 94 receives an RF control pulse on input 94*a* which effectively lowers the RF signal level. The RF control pulse is shown more particularly in FIG. 11*f*.

Figure 11A:
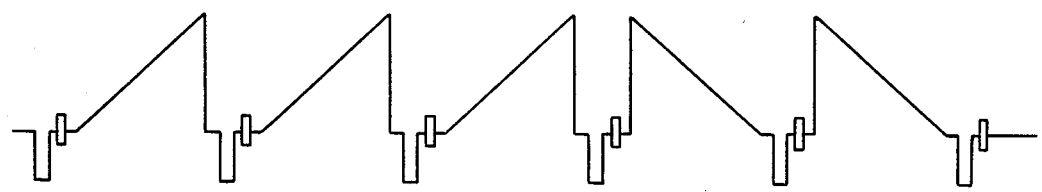
Figure 11B:
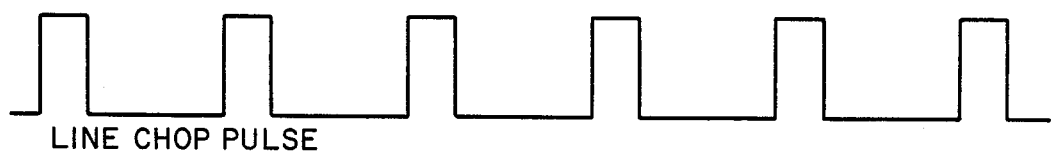
Figure 11C:
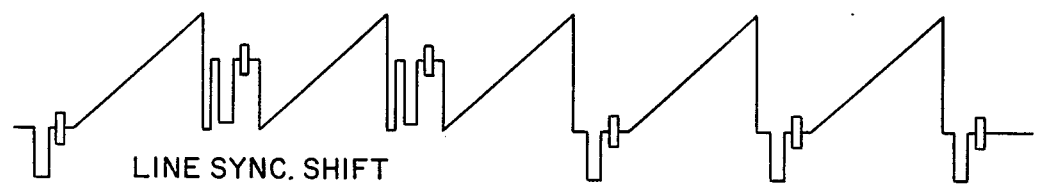
Figure 11D:
Figure 11F:
Figure 11G:
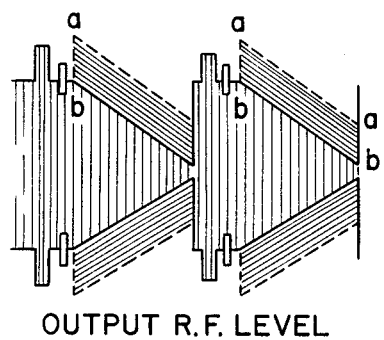

Referring now to FIG. 11f, the RF output of level shifting circuit 94 is shown. The first level (b) is the normal unshifted signal level, and (a) indicates the level shifted in response to an RF control pulse shown in FIG. 11f.

The RF control pulse is generated by circuit 93. Circuit 93 receives a line chop pulse shown in FIG. 11b as well as a field chop pulse, reset signal from field integrator 15, and a signal from flip-flop 29 indicating a line inversion. The RF control pulse of FIG. 11f occurs randomly under control of flip-flop 29. The relationship of the RF control pulse, video signal, line chop pulses, shifted line synchronization pulses, and time sync command data is shown in FIGS. 11a–11f.

Referring now to FIG. 12, there is shown specific details of circuit 93 for generating an RF control pulse. Random data from flip-flop 29 presets the divisor of counter 140. Counter 140 receives input pulses from the line chop pulse generator 18 of FIG. 1 after being inverted by inverter 139. Thus each line chop pulse transition is counted by counter 140.

Counter 140 provides an output signal which randomly changes during each field. The output of the counter 140 is applied to AND gate 146. AND gate 146 receives as a second input signal the output signal of AND gate 147. AND gate 147 receives as input signals both line chop pulses and vertical chop pulses. And gate 147 therefore enables AND gate 146 during that portion of the video signal which contains picture detail. Thus, random pulses are produced as shown in FIG. 11f during each field for modifying the RF level of the video signal during selective portions of each field. At the conclusion of a field, counter 140 is reset.

The resulting control pulse is applied to an RF level shifter 94 shown in FIG. 13. Referring to FIG. 13, there is shown a level shifter 94 which is suitable for level shifting the radio frequency signal in response to the control pulse from circuit 93. The level shifter 94 comprises a tuned FET 164 amplifier. The bias network for the FET amplifier 164 comprises potentiometer 161 and 162 serially connected to voltage source $V_1$. The drain connection of FET 164 is tuned by parallel tuned circuit 165. The source connection of FET 164 is returned to ground through diode 166. In operation, AND gate 146 will randomly alter the bias current through potentiometer 161. The resulting change in gain for FET 164 will alter the RF signal level from level shifting circuit 94.

Thus, the circuitry of FIG. 12 provides random shifting of the RF signal level during selective portions of the field.

Figure 1A:
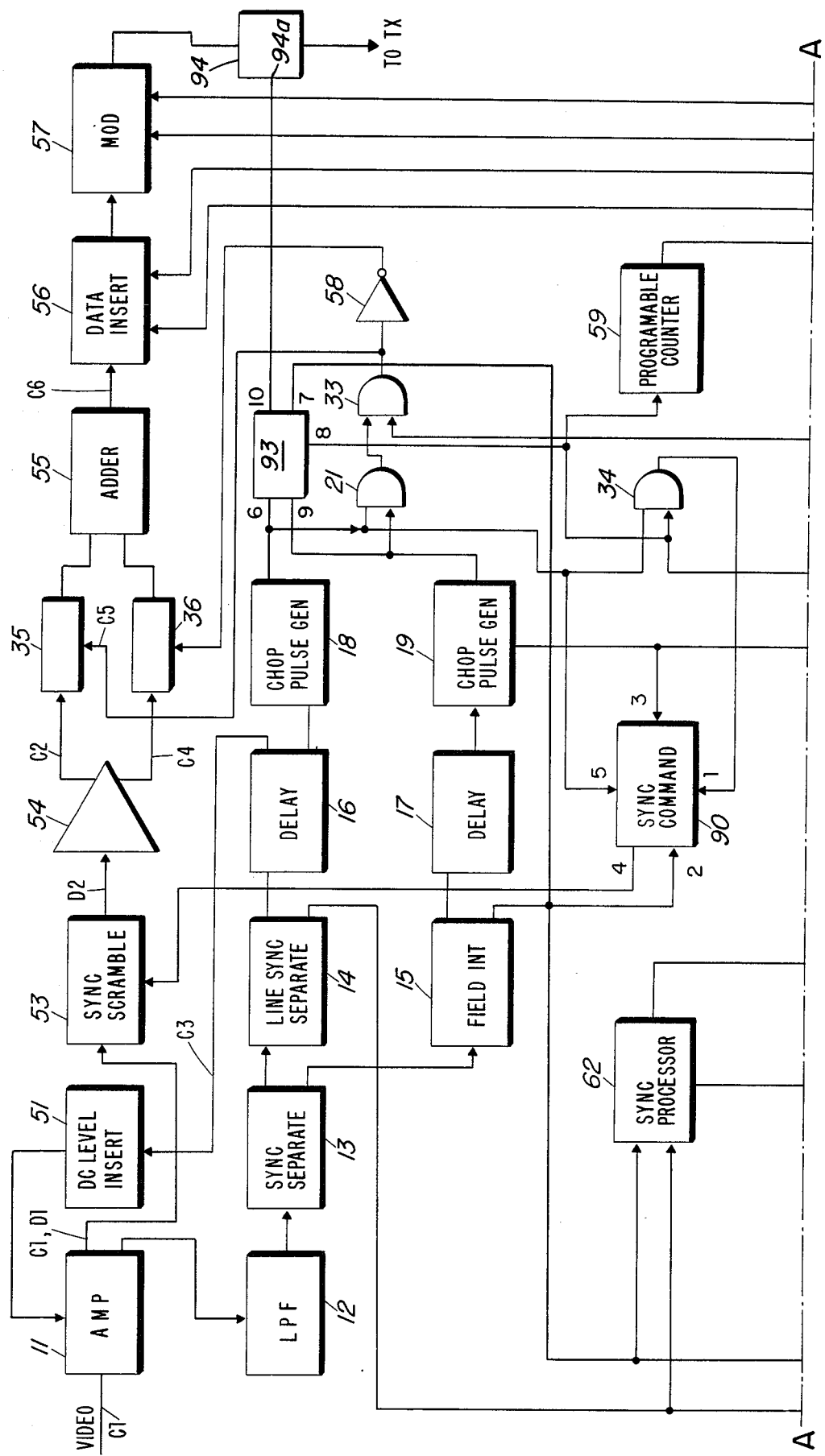
FIGS. 1a and 1b are block diagrams of an encoder for providing multiple degrees of scrambling to a video signal.
Figure 1B:
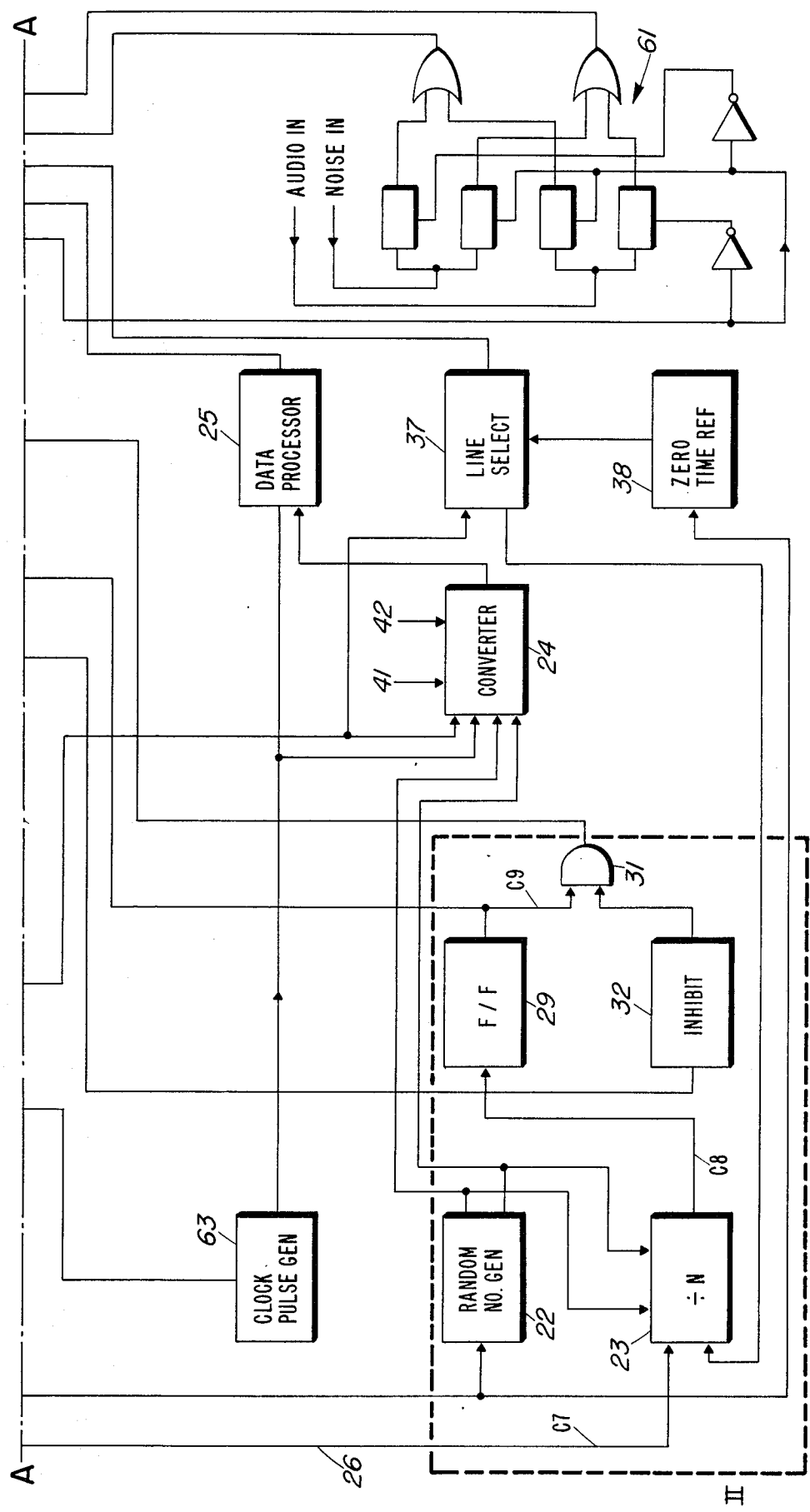
Figure 2A:
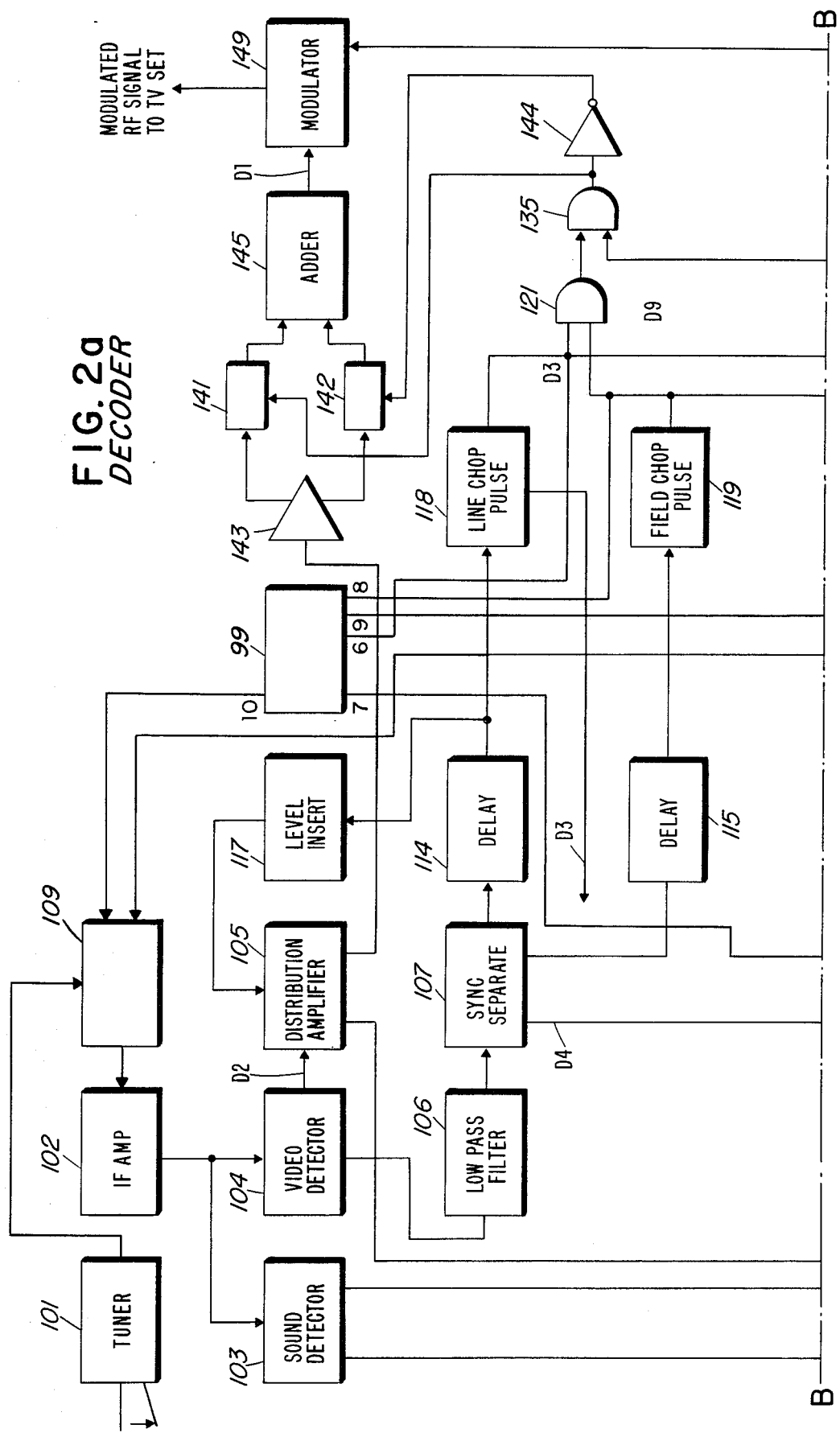

Circuitry for decoding a video signal encoded by the apparatus of FIGS. 1a, 1b is shown in FIGS. 2a, 2b.

Referring now to FIGS. 2a, 2b, the received signal is fed through a tuner 101 to a level shifter 109. The received signal is converted by tuner 101 to an intermediate frequency signal. The signal then passes to intermediate frequency amplifier 102 to separate sound and video signal detectors 103 and 104. The decoding of the sound signals is described in my co-pending application Ser. No. 91,781 filed Nov. 6, 1979. The detected video signal is applied from 104 to a distribution amplifier 105 and also to a low pass filter 106 and a synchronization separator circuit 107. A delay circuit 114 applies a delay of almost one line period to the output of the separator 107, in a similar manner to the circuit 16 of FIG. 1, and a line chop pulse generator is connected to the circuit 114 to generate line chop pulses (waveform D3) to cover the whole line period except for the video information period. The output of the circuit 114 is applied through a DC level inserter circuit 117 to adjust the level of the received composite video signal to compensate for the shift of potential applied by circuit 51. The adjusted signal is applied to a phase splitter 143.

The recovered field synchronization pulses are fed through a line drive generator 123 to a preset line selector 122 which selects the same lines after the beginning of the field as those selected by 37 in the encoder in response to data signals, by enabling a data gate 111 which connects the output of the distribution amplifier 105 to a data processor 124 which converts the biphase data in the composite video signal to ordinary binary signals. The data lines of the signal have not been inverted, since gate 32 in the encoder of FIG. 1 inhibits gates 31 and 33 during the selected data period. The data processor 124 feeds a serial to parallel converter 125 which produces decoding data, billing data and subscriber identity data. The decoding data represents the random number in parallel form corresponding to the output of the converter 24 in the encoder, and this is latched in a latch 126 and operates a divided-by-N counter 127 which is also fed with the output of the synchronization separator 107 to synchronize its counting with the lines of the picture. The selector 122 enables a programmed decoding starter circuit 112 to enable the counter 127 after completion of the data period, thus producing an output every N lines corresponding to the inverted lines, which output is fed to a flip-flop 128 which enables an AND gate 129 for alternate periods of N lines. The other input of the AND gate 129 is fed from a field chop pulse generator 119 described below, and the output of the AND gate 129 passes to an input of an AND gate 135 through a gate 131, the other input of the AND gate 135 being supplied by the output of the AND gate 121. The synchronization restore circuit 108 generates synchronization command data for bringing the randomly shifted synchronization pulses to an appropriate level whereby the starting point for each line of video signal is maintained the same. Synchronization restore circuit 108 is identical to the circuit 90 shown in FIG. 5 except that the output of counter 101 is inverted from that used in the counter 101 of the encoder. Those skilled in the art will recognize that many counters have optional outputs, one being inverted from the other. In practice therefore, outputs of opposite sense are taken from counter 101 for the encoder circuit 90 and restore circuit 108. The divisor N1 must of course be the same for circuit 90 and 108.

Figure 4:
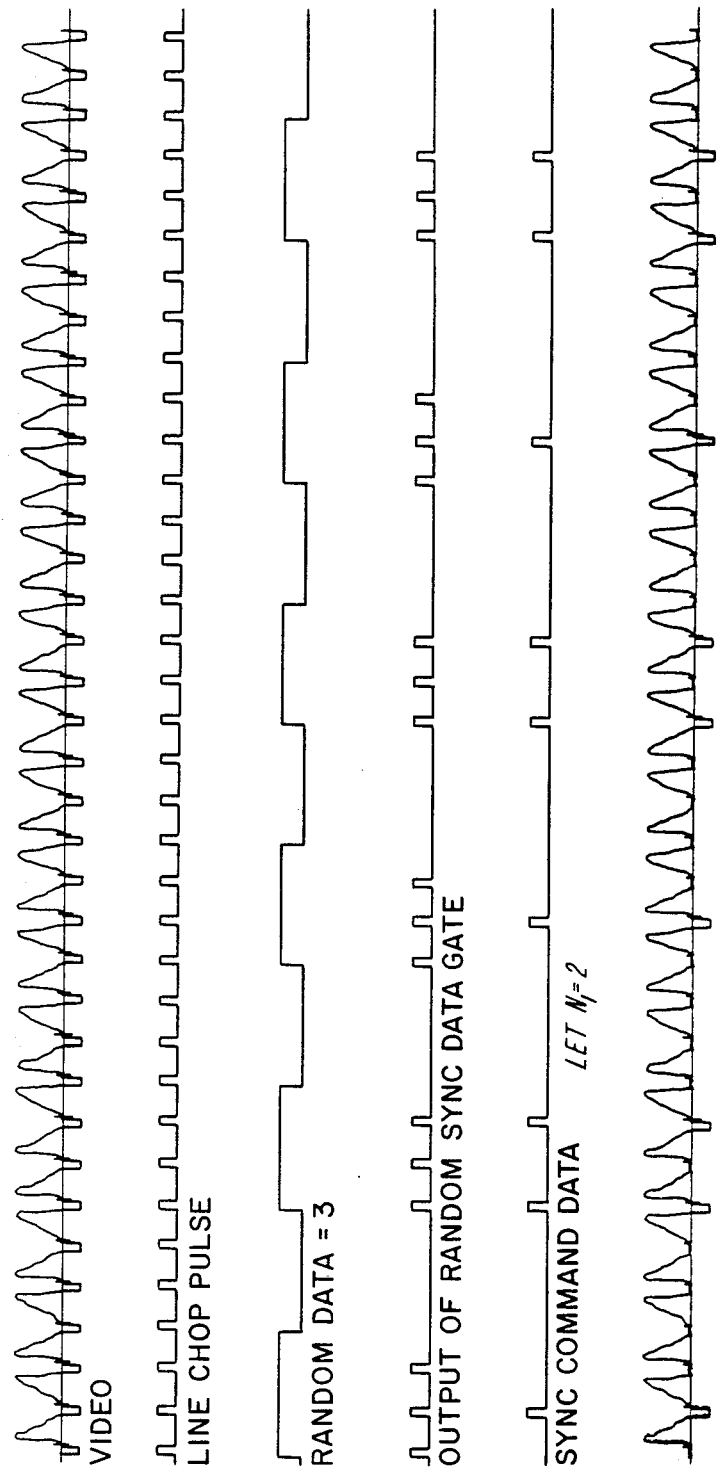
FIG. 4 illustrates signal waveforms produced by the encoder and decoder of FIGS. 1 and 2 for shifting synchronization pulses.

The operation of restore circuit 108 can be understood with reference once again to FIGS. 4 and 5. Line chop pulses are provided to an input of gate 120. Additionally flip-flop 128 provides an input C as shown in FIG. 4. The result is the production from gate 120 of a group of line chop pulses corresponding to the random number N shown to be 3 in FIG. 4, set in counter 127. The chop pulses are further divided by counter 101 in restore circuit 108. The synchronization restore circuit 108 applies shifting pulses to ciruit 109 thereby restoring the level of those line pulses previously shifted by the encoder during each field. Pulses from field chop pulse generator 119 and line chop pulse generator 118 are used to inhibit shifting the video signal during the vertical interval when data and indexing information is being recovered. A system reset is used to reset counter 101 at the beginning of a vertical interval by a pulse from starter circuit 112.

Circuit 109 is provided to shift the video signal amplitude in response to a command from either sync restore circuit 108 or from level controller 99. Level controller 99 is provided for those receivers which utilize RF level shifting during certain video lines of a picture field. The picture portion of the video signal is shifted in level under control of the flip-flop 128.

Referring now to FIG. 14, a level shifting circuit responsive to two inputs, 150, 151, is shown. The first input 150 represents a command from sync restore circuit 108 to shift a line synchronization pulse. The second input 151 represents a shift command for picture detail which occurs in response to an output signal from level controller 99. Circuit 109 is an FET common source IF amplifier having a drain tuned by parallel resonant circuit 153. The bias network 155 connecting the gate of FET 154 to a positive supply voltage includes potentiometers 156, 157 and 158. First and second analog switches 160, 161, are controlled by inputs 150, 151 respectively. The gain of FET 154 will be altered each time a pulse appears on inputs 150, 151. The signal from circuit 109 is applied to IF amplifier 102.

Details of circuit 99 may be readily understood by referring to FIG. 12. Circuit 99 is identical in all respects to circuit 93 shown therein. Random data from flip flop 128 is inserted as a divisor to counter 140. Line sync pulses are counted in counter 140 and at N counts gates 146 is enabled during picture portions of the video line. Gate 146 will provide a level shift pulse to modify the amplitude of the video signal for an entire line determined by counter 140. Circuit 99 receives on connections 6 and 8 line and field chop pulses. A system reset pulse is applied on connection 7 from starter circuit 112 to initialize the contents of counter 140.

Each subscriber has a magnitude card 132 which is placed in a card reader 133 and the reader output is compared in a card data comparator 134 with the subscriber identity data from the converter 125. Provided that the identity of the subscriber on his card does not match the list of unacceptable subscribers received from the transmitter during vertical interval, the gate 131 is enabled to pass the decoding data to the first input of gate 135, and the gate 131 also passes the billing data from the converter 125 to a card recorder 136 which acts on the magnitic card 132 to record on the card the charge to be made for the program being watched. At intervals, the card 132 is processed to establish the charge to be paid by the subscriber for the reception service.

The outputs of chop pulse generators 118 and 119 are applied through AND gate 121 to the remaining input of AND gate 135. The output of the AND gate 135 operates complementary gates 141 and 142 supplied by the phase splitter 143 which receives the output of distribution amplifier 105. The gate 141 is controlled directly from the output of AND gate 135, and the gate 142 is controlled through an inverter 144 from the output of the AND gate 135, so that the gates 141 and 142 are enabled alternately. Gate 129 will provide pulses for re-inverting groups of lines within a field which have been previously inverted. The adder 145 which receives the outputs of gates 141 and 142 has both the video information restored to its original polarity and level and the line synchronization signal restored to their original level, and this is fed to a modulator 149 in which the standard carrier signal is modulated with the decoded video signal from adder 145 and also with decoded audio signals from the audio decoding circuit indicated generally at 151. Audio decoding circuit 151 is supplied with decoding data from the converter 125 and with coded audio signals on two channels from the sound detector 103 in a manner as described in my co-pending application Ser. No. 91,781. The output of the modulator 149 is then applied to the standard television receiving set antenna input. The decoder 151 produces an audio output on a second channel which is used as desired.

In still another embodiment of the invention, encoding of the video signal may be accomplished in accordance with the apparatus shown in FIG. 7. In this embodiment, alternate lines of a portion of a video signal in each field are inverted. However, the first line of the inserted portions changes randomly from field to field.

FIG. 7 includes circuitry previously shown in FIG. 1 and illustrates control circuitry for determining when lines of video signal in a given field are to be inverted. The circuitry of FIG. 7 replaces the circuitry II of FIG. 1.

Referring now to FIG. 7, there is shown a computer 201 which may be any digital device for generating a serial binary word, the word being used to preset the counter 23. Switch S1 selects either the computer 201 or the random number generator 22 for providing a divisor to counter 23. Suitable gates 202 and 203 permit the steering of data from either the random number generator 22 or the computer into the divisor input of counter 23.

Thus, the transmitter may make use of a predetermined serial code by use of the computer 201 or may use a random number generated during each vertical field as a divisor for the counter 23. Gate 31 in FIG. 1 is enabled by a signal from flip-flop 29 and the data inhibit gate 32. The embodiment shown in FIG. 7 changes this somewhat so that enablement of the gate 31 is under control by a master data control unit 68. Master control 68 will enable gate 31 in response to an input from flip-flop 29 indicating that the counter has reached the predetermined count. At that time, master control unit 68 will alternately enable gate 31 which alternately enables gate 33, thereby providing during each field of video signal alternate lines of video which are "inverted". By inverted, it is understood that the luminance level and chrominance indicated by the video signal is shifted such that a television receiver demodulating the video signal displays a line having an incorrect brightness level and color. At the conclusion of a field marked by the presence of a vertical synchronization pulse, the counter 23, master control 68, flip-flop 29, are reset until the next field represented by the video signal begins. At this time the counter 23 commences counting again and the sequence is repeated whereby the counter output will enable the master data control unit 68 through flip-flop 29 after a predetermined number of lines have been counted to provide an alternate sequence of inverted video lines.

Figure 8:
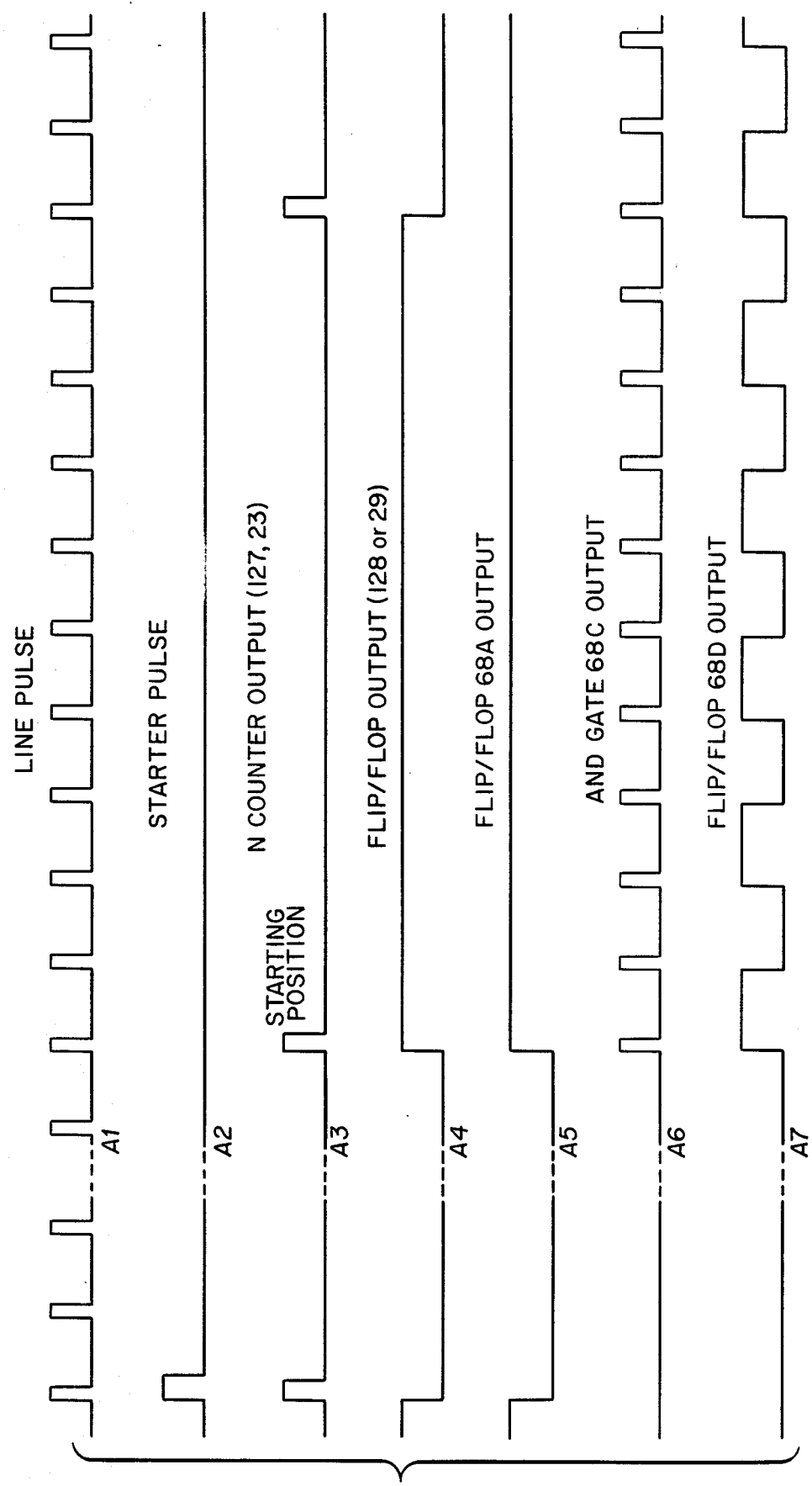
FIG. 8 is an illustration of signal waveforms produced by the apparatus of FIGS. 7 and 9.

The operation of FIG. 7 in more detailed explanation is as follows. When data is supplied by the steering gates 202 and 203, the counter 23 is set with either a random number for a divisor or the number provided by the computer 201. Clocking of the counter 23 is achieved by line synchronization pulses from the line synchronization separator 14. When the desired count has been achieved, video line inversion commences. In FIG. 8, appropriate timing diagrams illustrate the starting position pulse provided by the counter output A3 with respect to the line pulses received from the synchronization separator 14. Flip flop 29 is thereafter set which enables the master data control unit 68.

Referring now to FIGS. 8 and 9, there is shown more specifically a master control unit 68. The flip-flop 68A within the master control unit is toggled by the flip-flop 29 to enable AND gate 68C. AND gate 68C thereby commmunicates a toggling signal to a second flip-flop 68D within the master control unit 68 which is clocked by line synchronization pulses A. The output of the flip-flop 68D is returned to AND gate 31 whereby, as shown in FIG. 8, it is alternately enabled upon receipt of succeeding line synchronization pulses. Therefore, gate 33 which controls the inversion of the video signal lines is alternately enabled, thereby providing a sequence of video lines which are alternately inverted.

Thus, there has been described with respect to FIG. 7 an apparatus which will permit changing the level of the line synchronization pulses as well as providing for inversion of video signals over a portion of a given field of a picture being transmitted. The apparatus of FIG. 7 shifts the line synchronization pulses as was done in the embodiments of FIG. 1. The line synchronization pulse therefore is shifted under control of gate 34 and sync command circuit 90.

At the conclusion of a field being transmitted, the line selector coding starter circuit 37 provides, as was one in the previous embodiments, a reset signal to both the master data control unit 68 and the counter 23. The master data control signal resets the two flops 68A, 68D associated therewith and the counter 23 begins to count upon receipt of the next line of video signal representing the successive field to be scrambled. As is true in the previous embodiment of FIG. 1, gate 33 is only enabled when video information is being transmitted, and is disabled during the line and vertical blanking of the signals. Data processor 25 and parallel-to-serial converter 24 as in the previous embodiment, transmit in the format of a biphase modulated code the number which has been set for the divisor in counter 23. Thus, it can be seen that the embodiment of FIG. 7 permits for scrambling of the signal under control of the random number generator 22 or of the computer 201. The starting point of the alternate video line inversion during each field of video information is altered in accordance with the signal produced by the computer 201 or random number generator 22.

Modifications 11 to the receiver of FIG. 2 useful for receiving and decoding the transmitted data provided by the embodiment of FIG. 7 is shown more particularly in FIG. 10. FIG. 10 includes a master data control unit 68 not shown in the embodiment of FIG. 2. In other respects, the subject matter of FIG. 10 is identical to FIG. 2.

The master data control unit 68 of FIG. 10 is identical to the unit 68 shown in FIG. 9. When counter 127 provides an output to flip-flop 128, the master data control unit 68 provides an output in response to flip-flop 128. The master data control unit 68 is enabled during each line synchronization pulse, and when the first flip-flop 68A is in the set condition, the second flip-flop 68D is toggled when each line synchronization pulse is received, thereby corresponding with each inverted line of video signal. At the end of a field, the program decoding starter 112 resets the counter 127, as shown in FIG. 8, the flip-flops in the master data control unit 68 and flip-flop 128 and the sequence is repeated for the next field. The following field produces a binary signal which is processed by the data processor 124 and serial-to-parallel converter 125. The resulting parallel decoded word corresponds to the number set in the counter 22 as the divisor in the transmitter unit is latched in latch 126 and presented as a divisor in counter 127. The counter 127 then counts as in the previous field until a desired count is obtained indicating the beginning of the scrambling sequence.

Thus there is described an apparatus for alternately inverting the lines of video signal for a portion of each field. The video line inversion technique when used with the aforementioned technique of line synchronization pulse shifting, or with the RF signal level shifting, or both, will add security to the scrambled signal.

I claim:

1. An apparatus for scrambling a video signal, said video signal comprising a series of signals each representing lines within a field, each of said series of signals preceded by a line synchronization pulse for positioning a scanning beam in a television receiver comprising:
   means for generating a random number N during each of said fields, said random number changing with subsequent fields;
   means for producing random synchronization data from said random number, said data occurring coincident with certain of said synchronization pulses at an irregular interval;
   means for altering the level of said certain synchronization pulses;
   means for polarity inverting a plurality of alternate lines of a field of said video signals, said alternate lines being separated by a non-inverted line, the first of said inverted lines being identified by said random number which changes for subsequent fields; and
   means for combining a signal representing said random number with said video signal during a vertical interval thereof, whereby a scrambled video signal containing decoding data, a plurality of alternate inverted lines with randomly modified synchronization pulses is produced, subsequent fields, having different synchronization pulses with altered levels and having a different number of alternate lines inverted.

2. An apparatus for scrambling a video signal representing a plurality of lines in a picture, said video signal amplitude modulating a radio frequency carrier signal comprising:
   means for generating a random number for each field of said video signal;
   a first scrambling means for inverting the polarity of a plurality of alternate lines of said video signal identified by said random number before modulating said carrier signal, whereby a scrambled video signal results;
   a second scrambling means for modifying the amplitude of a portion of said modulated carrier signal representing a line identified by said random number, whereby said video signal is first scrambled at a video level and subsequently scrambled at an RF level; and
   means for transmitting said carrier signal having an inverted video signal portion and a modified amplitude along with said random number.

3. An apparatus for scrambling a video signal comprising:
   means for generating a random number identifying a scrambling sequence for each field of said signal;

means for producing random synchronization data from said random number, said data identifying certain line synchronization pulses within said field;

means for altering the level of said certain synchronization pulses;

means for modulating said video signal on a radio frequency carrier signal;

means for modifying the amplitude of a portion of said modulated radio frequency carrier signal identified by said random number without modifying a line synchronization portion of said radio frequency carrier signal; and means for combining said random number and radio frequency carrier whereby a scrambled video signal including decoding data is produced.

4. An apparatus for scrambling a video signal comprising:

means for generating a signal identifying portions of a video signal to be polarity inverted;

first scrambling means for inverting said identified portion of said video signal;

means for modulating said video signal on a radio frequency carrier signal;

second scrambling means for modifying the amplitude of a portion of said radio frequency carrier signal carrying picture information, whereby said video signal is scrambled before and after modulating said radio frequency carrier; and means for combining said signal identifying said portions with said video signal, whereby a composite scrambled signal is produced including a decoding signal.

5. The apparatus of claim 4 further comprising:

means for identifying certain line synchronization pulses contained in said video signals forming an irregular pattern with the remaining of synchronization pulses; and means for shifting the level of said certain line synchronization pulses.

6. The apparatus of claim 5 wherein the pattern of said certain synchronization pulses changes between fields.

7. An apparatus for scrambling a video signal, said video signal comprising a plurality of signals representing individual lines of a picture field, said signals each being separated by a line synchronization pulse identifying the beginning point of a line comprising:

means for randomly identifying the first of a plurality of said lines to be scrambled, whereby said plurality of lines are randomly selected for each field;

means for inverting the polarity of alternate lines following said identified line, whereby the brightness level of said alternate lines is modified;

means for identifying certain of said line synchronization pulses, said certain pulses occurring at an irregular interval, the pattern of said identified line synchronization pulses changing every field;

means for modifying the level of said identified synchronization pulses; and means for combining a data signal identifying said first line and identifying modified synchronization pulses with said video signal, whereby a composite scrambled video signal is produced including decoding data having a different number of alternate inverted lines and a different set of modified synchronization pulses in subsequent fields.

8. The apparatus of claim 7 wherein said data signal is inserted between fields of said picture.

9. An apparatus for scrambling a television video signal, said signal comprising a plurality of line synchronization pulses separating a plurality of signals representing the brightness level of lines of a field comprising:

means for generating a random number N preceding each of said fields;

means for counting said line synchronization pulses, said counter being preset by said random number whereby an output occurs after N lines have been produced;

gate means connected to be enabled by said counter after N line synchronization pulses have been counted, said gate means connected to provide line synchronization pulses after being enabled;

means for dividing pulses produced by said gate means whereby pulses are produced at an irregular interval after N lines have occurred; and means for modifying line synchronization pulses in said video signal which are coincident with pulses produced by said means for dividing whereby modified line synchronization pulses are produced in an irregular pattern.

10. The apparatus of claim 9 further comprising:

means for resetting said means for counting and said means for dividing at the beginning of a field.

11. The apparatus of claim 9 further comprising means for suppressing the output of said means for dividing during a vertical blanking period.

12. The apparatus of claim 9 wherein said synchronization pulses are modified by shifting the level of said line synchronization pulses.

13. In a system for scrambling television signals wherein a plurality of synchronization pulses separating signals representing lines following a predetermined line in a field are modified to form a predetermined pattern with unmodified synchronization pulses, a decoding apparatus comprising:

a video signal detector for supplying said video signal;

a line chop pulse generator for supplying chop pulses in response to said video signal;

counter means for counting each of said lines in said video signal, said counter means providing an output when said predetermined line is counted;

a flip-flop connected to said counter means, said flip flop providing an output which changes state each time said counter provides an output signal;

a gate means connected to receive line chop pulses and pulses from said flip-flop whereby regular sets of pulses are produced;

a divider for receiving said sets of synchronization pulses from said gate means, said divider being preset to a number identifying said predetermined pattern, said divider producing synchronization command data; and means for modifying said video signal line synchronization pulses which correspond to said synchronization command data whereby said modified pulses are restored to a level corresponding to unmodified synchronization pulses.

14. The apparatus of claim 13 wherein said modified pulses are level shifted, and said means for modifying shifts the level of said modified pulses.

15. The apparatus of claim 13 further including means for inhibiting said means for modifying said line synchronization pulses during a vertical blanking period of said video signal.

16. In a television scrambling system having a plurality of lines in a video signal field inverted, the first of said inverted lines being identified by data contained within a vertical interval, and where a plurality of synchronization pulses at an irregular interval within a field are level shifted with respect to the remaining synchronization pulses, a decoder comprising:
  means for supplying said video signal;
  means for removing said data from said vertical interval;
  a line chop pulse generator;
  a counter for counting said lines;
  means for presetting said counter with a divisor corresponding to said data whereby said counter provides an output signal when the number of pulses counted is equivalent to said data, said output signal occurring at the time said first inverted line is being received;
  means for inverting a plurality of inverted lines following said first line;
  means for producing synchronization command data identifying said level shifted synchronization pulses comprising:
  a flip-flop connected to be toggled by said counter output signal,
  an AND gate having one input connected for receiving line chop pulses and a remaining input connected to said flip-flop, said AND gate providing a series of chop pulses at a regular interval,
  a divider for receiving said series of chop pulses, said divider providing an irregular pattern of chop pulses coincident with said shifted synchronization pulses; and
  means for level shifting synchronization pulses occurring simultaneously with said divider output signal whereby said synchronization pulses are restored to a level for correctly displaying a line following said synchronization pulses.

17. An apparatus for encoding a television signal comprising:
  means for supplying a video signal comprising a plurality of lines forming multiple fields; said lines comprising an information portion preceded by a line synchronization portion;
  means for generating between each of said fields a unique binary code identifying at least one line of a succeeding field;
  means for amplitude modulating a radio frequency signal with said video signal;
  means receiving said radio frequency modulated signal for subsequently changing the amplitude level of said modulated radio frequency signal at a portion corresponding to the information portion of said identified line without modifying said synchronization line portion; and
  means for combining said unique binary code with said radio frequency signal, whereby a scrambled video modulated signal including decoding data is produced.

18. The apparatus of claim 17 wherein said means for combining said unique binary code includes means for inserting a data signal identifying said unique binary code between fields of said video signal.

19. An apparatus for decoding a scrambled television signal, said television signal including a radio frequency carrier signal modulated with a video signal representing a plurality of lines comprising a plurality of fields, said radio frequency carrier signal being subsequently amplitude level shifted over a portion representing at least one line of each field of said video signal, and including a decoding signal identifying said at least one line comprising:
  means for converting said radio frequency signal to an intermediate frequency signal;
  means for shifting the amplitude of said intermediate frequency signal in response to a decoding signal; and
  means for removing said decoding signal from said television signal, said means for removing said decoding signal connected to said means for shifting, whereby said intermediate frequency signal is descrambled by restoring the amplitude of portions of said intermediate frequency signal identified by said decoding signal corresponding to said at least one line.

20. The apparatus of claim 19 wherein said means for removing said decoding signal comprises:
  a detector means for removing a binary coded signal contained between fields of said television signal;
  a latch means for retaining said binary coded signal;
  a first presettable counter connected to said latch means to be preset by a divisor corresponding to said coded signal, said counter operatively connected to count each of said lines within a field;
  a flip flop connected to be triggered by said counter;
  a second presettable counter connected to be preset with a divisor from said flip flop;
  said second counter connected to count said lines whereby a level shifting signal is produced each time said second counter counts a number of lines equal to its divisor.

* * * * *